Patented Sept. 1, 1936

2,052,570

UNITED STATES PATENT OFFICE 2,052,570

SULPHONATION OF OIL

Philip Kaplan, Brooklyn, N. Y., assignor to The Richards Chemical Works, Inc., Jersey City, N. J., a corporation of New Jersey No Drawing. Application January 27, 1933, Serial No. 653,832

18 Claims. (Cl. 87—12)

This invention relates to sulphonated fatty aliphatic acids, and esters, hereinafter termed fatty aliphatic compounds, and its chief object is to provide improved sulphonated products which are resistant to acids and alkali earth salts and are characterized by extreme solubility, penetrative power and dispersive action, making them desirable for use in the textile, leather and allied industries. A further object is to provide a simple and economical process of producing such products. To these and other ends the invention comprises the novel process and product hereinafter described.

A novel feature of my improved sulphonated fatty aliphatic compound is that the aliphatic compound has attached to it a hydrogen-carbon radical from a hydrocarbon which is a gas at ordinary temperatures or at the temperature of the sulphonating process, and which consists of one or more chains but having a total of not more than five carbon atoms. Particularly good results have been obtained with hydrocarbons of the paraffin series, corresponding to the general formula $C_nH_{2n+2}$, the olefine series, $C_nH_{2n}$, and the acetylene series, $C_nH_{2n-2}$, but the invention is not limited thereto, other hydrocarbons being usable, especially homologous, isomeric and derivative compounds of the above series.

The process comprises treating the fatty aliphatic compound, before, during or promptly after addition of the sulphuric acid, with the selected gaseous hydrocarbon and an inorganic (preferably gaseous) reagent which will react with the hydrocarbon to form a compound which will in turn react with the fatty aliphatic compound to attach thereto the desired hydrogen-carbon radical. Various inorganic gaseous reagents can be used for the purpose, as for example chlorine and other halogens and their gaseous acids, oxides and peroxides, gaseous metallic chlorides, oxychlorides, perchlorates, and carbonyl chlorides, chlorsulphonic acid, etc. The hydrocarbon and the reactive gas are brought into intimate mixture with the fatty aliphatic compound and sulphonating agent in the presence of a dehydrating agent such as, for example, phosphorus pentoxide, trichloride, pentachloride and oxychloride, glacial phosphoric acid, acetic and other organic acid anhydrides, selenic acid, selenium oxychloride, etc. It will be understood that the effect of the dehydrating agent is to remove moisture, as such, from the fatty aliphatic compound by reaction with the moisture to form a compound which is harmless or useful and thus can be left in the fatty aliphatic compound or which can be removed therefrom. In some cases, for instance when ethylene is used as the gaseous hydrocarbon, some of the sulphuric acid, added for sulphonating the fatty aliphatic compound, forms with the ethylene the compound which reacts with the fatty aliphatic compound to attach the hydrogen-carbon radical thereto.

The addition of a suitable solvent of the fatty aliphatic compound before, during or after the application of the present invention does not materially affect the product. Such solvents as pine, oil mineral oil, aromatic hydrocarbons halogenated solvents, organic solvents, and the like, sometimes used in sulphonation processes, may be employed.

Specific examples of the preferred practice of the process may be given as follows.

Example 1

In using my process in the preferred way with olive oil I take 100 parts of the oil and add thereto 5 to 10 parts of acetic anhydride and 35 or more parts (up to say 100 parts) of commercial sulphuric acid, adding the latter with the proper stirring and temperature control. During the addition of the acid I may bubble through the mass acetylene and chlorine gas in substantially equal molecular proportions. During this operation the mass is thoroughly agitated and the temperature is regulated to keep it down to at most 50° C., preferably to 35° or even lower. The addition of the reagents is continued until the mass has been increased in weight by about 10 per cent by absorption of the acetylene. The stirring of the mass is thereafter continued, say from 2 to 10 hours, after which the mass is washed. The washing may be accomplished in the usual manner, that is, with water or with glauber salt solution, common salt or alkaline solution, but I prefer methyl, ethyl or other water-soluble alcohol, using the same in amount about twice that of the oil-acid mass, by volume. The washed mass is then worked up in the usual way, that is, by separating the salts or acid water and neutralizing with a suitable alkali.

Example 2

For producing a sulphonated product from castor oil, to 100 parts of said oil are added 35 to 100 parts of commercial concentrated sulphuric acid, the latter being added slowly, while well stirring the mass, and while keeping the temperature below 50° C., and preferably at not above 35° C.. or even lower. During this step, and preferably continued after the mixing, I may bubble into the reacting mass, ethylene gas (and if desired sulphur trioxide). I may also add 5 to 10 parts of phosphorus pentaoxide, as a dehydrating agent, either initially, or when adding the sulphuric acid, or later. The ethylene and sulphur trioxide are preferably used in about equimolecular proportions, and these two materials may be bubbled in until the mass has increased in weight by about 5 to 15% (say 10%). The stirring is thereafter continued for another 2 to 10 hours. The washing and neutralization can be carried out as in Example 1.

I claim—

1. In the sulphonation of a sulphonatable fatty aliphatic compound selected from the group consisting of fatty aliphatic acids and fatty aliphatic esters, the step of bubbling into the liquid mixture of said aliphatic compound and a sulphonating reagent, while said aliphatic compound is being sulphonated, a gaseous hydrocarbon having not more than 5 carbon atoms, in the presence, in the mixture being sulphonated, of a reagent adapted to cause attachment of the hydrogen-carbon radical of said gaseous hydrocarbon to the said aliphatic compound.

2. In the sulphonation of a sulphonatable fatty aliphatic compound selected from the group consisting of fatty aliphatic acids and fatty aliphatic esters, the step of bubbling into the liquid mixture of said aliphatic compound and a sulphonating reagent, while said aliphatic compound is being sulphonated, a gaseous hydrocarbon having not more than 5 carbon atoms, and concurrently therewith bubbling into the said mixture being sulphonated, a gaseous inorganic reagent selected from the class consisting of the halogen elements and the gaseous halogen compounds, said inorganic reagent being capable of causing the hydrogen-carbon radical of said gaseous hydrocarbon to attach itself to said aliphatic compound.

3. In the sulphonation of fatty glyceride oils, the step of bubbling into a mixture of said oil and sulphonating reagent, while said oil is being sulphonated, a gaseous hydrocarbon having not more than 5 carbon atoms, in the presence in said mixture, of a gaseous inorganic reagent adapted to cause attachment of the hydrogen-carbon radical of said gaseous hydrocarbon, to the said oil, said reagent being selected from the class consisting of the halogens and gaseous halogen compounds.

4. A process as covered in claim 3, in which the fatty glyceride oil treated is olive oil.

5. A process as covered in claim 3, in which the fatty glyceride oil treated is castor oil.

6. A process as covered in claim 3, in which the gaseous inorganic reagent is bubbled into the reaction mixture during the sulphonation operation.

7. A process as covered in claim 1, in which the hydrocarbon is an unsaturated open chain hydrocarbon.

8. A process as covered in claim 1, in which the hydrocarbon is a hydrocarbon of the ethylene series.

9. A process as covered in claim 1, in which the hydrocarbon is a gaseous hydrocarbon of the acetylene series.

10. A process as covered in claim 1, in which the gaseous hydrocarbon is acetylene gas.

11. A process as covered in claim 2, in which a mixture of acetylene and chlorine, in substantially equimolecular proportions is bubbled into the mixture undergoing sulphonation, and while the temperature of the mass is maintained at not above 50° C., and continuing the said introduction of acetylene and chlorine until the mass has increased in weight by about 10%.

12. A process as covered in claim 2, in which the sulphonatable fatty aliphatic compound is a glyceride oil, and in which a mixture of acetylene and chlorine, in substantially equimolecular proportions is bubbled into the mixture undergoing sulphonation, and while the temperature of the mass is maintained at not above 50° C., and continuing the said introduction of acetylene and chlorine until the mass has increased in weight by about 10%.

13. A sulphonated fatty aliphatic compound selected from the group consisting of sulphonated fatty aliphatic acids and sulphonated fatty aliphatic esters, having attached to it the hydrogen-carbon radical of a gaseous open chain hydrocarbon containing not over 5 carbon atoms.

14. A product as covered in claim 13, in which the hydrogen-carbon radical is a radical of an unsaturated open chain hydrocarbon.

15. A product as covered in claim 13, in which the hydrogen-carbon radical is a radical of an olefine hydrocarbon.

16. A product as covered in claim 13, in which the hydrogen-carbon radical is a radical of an acetylene hydrocarbon.

17. Sulphonated castor oil having attached to it the hydrogen-carbon radical of a gaseous hydrocarbon of the olefine series.

18. Sulphonated olive oil having attached to it the hydrogen-carbon radical of a gaseous hydrocarbon of the acetylene series.

PHILIP KAPLAN.